United States Patent [19]

Parkinson et al.

[11] Patent Number: 5,183,845
[45] Date of Patent: Feb. 2, 1993

[54] POLYMER TREATMENT COMPOSITIONS

[75] Inventors: Jeff Parkinson, Lawrenceville; Anthony J. O'Lenick, Jr., Lilburn, both of Ga.

[73] Assignee: Siltech Inc., Norcross, Ga.

[21] Appl. No.: 465,986

[22] Filed: Jan. 16, 1990

[51] Int. Cl.⁵ ............................................. C08K 5/22
[52] U.S. Cl. .................................. 524/726; 524/731; 524/773; 524/765; 524/837; 524/838; 106/287.11
[58] Field of Search ............. 524/837, 838, 765, 773, 524/731, 726; 106/287.11

[56] References Cited

U.S. PATENT DOCUMENTS 4,247,330  1/1981  Sanders ........................ 106/287.11
4,509,981  4/1985  Sanders, Jr. et al. ........ 106/287.11

Primary Examiner—Melvyn I. Marquis

[57] ABSTRACT

A composition and process for protecting, preserving, and renewing surfaces, especially rubber and other natural and synthetic polymers, leather, and wood is disclosed. The emulsions of the present invention are applied to the polymer surfaces and by virtue of the composition, once applied, the emulsion will break causing the deposition of a uniform coating of treatment chemical. The treatment chemical is formulated to protect, renew and preserve the polymer surface being treated. The treatment composition comprises dimethylpolysiloxane fluid, an aminofunctional dimethylpolysiloxane, a wetting agent, an emulsifier pair, and an agent which causes the emulsion to break when applied to the surface. Each component contributes to the performance of the composition and facilitates the proper deposition of treatment chemical.

8 Claims, No Drawings

5,183,845

POLYMER TREATMENT COMPOSITIONS

This invention relates to improved polymer treatment compositions for preserving, renewing, protecting and enhancing the appearance of rubber, leather, and polymer surfaces. This is achieved by incorporation into the treatment emulsion, at least one member of each of class a–e. The classes are; (a) dimethylopolysiloxanes (b) aminofunctional dimethylpolysiloxanes (c) wetting agents, to allow for the penetration of the other components into the polymer surface, (d) emulsification agents which facilitates the production of a stable emulsion, (e) an very importantly, a "rain out" agent, which upon application of a thin film of the composition to the polymer surface being treated, rapidly causes the emulsion to break and the water to "rain out" of the emulsion leaving a uniform film of the other components of the composition.

One of the objects of the invention is to provide a superior preservative and process for application to natural and synthetic polymer surfaces and particularly rubber, to improve their appearance. Another object is to provide a preservative which will afford a substantial measure of protection to such surfaces against the deleterious effects of ozone, ultraviolet radiation, and other environmental causes of the degradation of rubbers and plastics and even leather. Still another objective is to eliminate the labor and time required to buff or wipe the article having been treated to obtain a uniform film. Another object is to provide a composition which will penetrate the polymer being treated.

While not limited thereto, a major application for the invention lies in protecting and improving the appearance and useful life of rubber parts of automobiles auto tires, rubber sealing strips, and vinyl tops. These are subject to deterioration with time due to their exposure to environmental stresses such as ultraviolet radiation, ozone, dirt, water and grease. Subjected to such environmental stresses, the rubber molecules at the surface undergo scission. The result is a structural change in the rubber surface that enables molecules of soil and other contaminants to adhere to that surface in greater degree whereby the surface becomes discolored. Further, scission of the rubber molecule chains causes surface cracking. Further release of other constituents of the rubber body that are not chemically combined with the rubber molecules but are held in place only mechanically in suspensions and otherwise is called bloom and that phenomena also results in discoloration.

The invention provides a substance which will protect the rubber against ozone, ultraviolet and the other environmental causes of chain scission. Additionally, it will not only seal and renew treated polymer surfaces as some compounds of the current art will, but the compositions of the present invention will also penetrate the polymer surface, provide protecting lubrication to molecules which are not at the polymer's surface.

Similarly, preservatives made according to the invention will renew, protect and enhance the appearance of plastics, particularly vinyls and acrylics, even when these plastics are ingredients in paints. The invention is particularly useful for protecting all types of rubbers, vinyls, and acrylics and even leather and wood wherever found. Furniture coverings industrial belting, plastic mop boards are examples of important applications and illustrate the wide range of those applications.

DESCRIPTION OF THE PRIOR ART

The oldest materials used for the preservation of rubber were based on lamp black and included materials highly corrosive to metal and painted surfaces commonly found on automobiles. These rubber treatment materials were applied like paint to the rubber surfaces. The rubber treated in this manner had an unnatural "painted" appearance. Reapplications required removal of old coatings, and were difficult and inefficient. Not only were such materials ineffective in protecting rubber surfaces from deterioration caused by environmental stresses, but they were also quite messy and difficult to use. In addition, the corrosive and toxic ingredients were harmful to the adjacent surfaces and to the user.

It is also known that dimethylpolysiloxane polymers can be applied to the surface of rubber to give a surface protecting and sealing film. One such method of application is direct application of the dimethylpolysiloxane to the polymer surface. While resulting in some surface protection the method of application is cost ineffective and results in a nonuniform greasy film. Another method is to dissolve the dimethylpolysiloxane in a solvent like mineral spirits and apply the solution to the tire. In addition to the environmental liabilities of using a polluting flammable solvent, the solvent often has a deleterious effect upon the rubber. The last and most accepted application method is the preparation of an aqueous emulsion using a surface active agent and high pressure processes like homogenization to get a milky white liquid.

There have been several practical limitations on the use of such an aqueous product. Most of which result from two problems (a) the inability to lay down a uniform film without several applications, and (b) the sealing of the polymer surface. Several inventors have addressed the problems. Most notably, U.S. Pat. No. 3,956,174 issued May 1976, to Palcher discloses that a dimethylpolysiloxane emulsion can be improved by addition of from about 15% to about 65% by weight of one or more polyol compounds, preferably diethylene glycol and glycerin. The patent teaches that the preservative disclosed is compounded of nontoxic materials which are safe for the user as well as for surfaces adjacent to rubber parts on automobiles. The Palcher invention attempts to seal up the tire's pores by inclusion of these polyols. This may be cosmetically appealing, but is not the preferred way to treat the polymer surface. Polymers are porous materials through which pass small amounts of water, environmental gases, ozone and other materials. The degradation of the polymer which starts on the surface, also occurs within the porous polymer matrix. While sealing up the porous structures with the Palcher compositions, minimizes surface degradation, little protection is given to the internal polymer structure. Until the compositions of this invention, surface treatments were all that was available.

Additionally, the Palcher invention left unresolved the troublesome need for multiple applications, with time in between and the need to buff or rub the surface after application to obtain a uniform surface coverage. Palcher states;

"First, the surface which is to be treated should be thoroughly wetted by the preservative composition. This can be accomplished in any convenient manner, such as by rubbing, spraying, painting, immersion and the like.

After wetting the surface, it is important to allow sufficient time for the preservative composition to penetrate the surface. During this time, it is believed that the preservative composition is taken into the surface pores by capillary action. For best results, a period of from at least about 24 hours should be allowed for penetration. If lesser periods are resorted to, optimum results will not be achieved. If desired, any surface excess can be removed by a light rubbing, after the penetration period.

At least one additional application of the preservative should then be made to the surface in the same manner as for the first process steps. After waiting an additional twenty four hours, the surface can then be lightly buffed with a soft cloth to provide increased gloss, if desired. Preferably, however, the preservative is applied to the surface at least three times, with a 24 hour lapse of time for penetration between each application.

By following these steps, maximum protection of the surface which is being treated will be obtained for the longest period of time. Additional coatings can be applied if desired. However, it is believed that in most cases, three applications are adequate."

Many automated applications, like car and truck wash systems cannot accommodate rubbing, or repeated applications. These processes are labor intensive. This limitation has severely limited the acceptance and wide scale use. Within the markets covered by the automated truck and automotive washes, are many potential customers that have a strong need for this type of polymer treatment. None of the compositions currently marketed can address these problems.

SUMMARY OF THE INVENTION

The compositions of the current invention are treatment emulsions which are admixtures containing at least one component from the following classes (a) dimethylopolysiloxanes (b) aminofunctional dimethylpolysiloxanes (c) wetting agents, to improve the penetration of the composition into the polymer being treated, (d) emulsification agents which facilitate the production of a stable emulsion, and most importantly, (e) "rain out agents" which upon application of a thin film to the polymer surface being treated, cause the emulsion to break and the water to "rain out", leaving a uniform film of the treatment composition. Additionally, the compositions of the present invention may contain other additives like colors, rust inhibitors, preservative and fragrances.

In order to preserve and renew surfaces the treatment composition of the invention are applied to the polymer surface to be treated. One preferred method is spraying. The compounds of this invention can be applied to the polymer surface, wet or dry. Previous compositions were applicable only to wet surfaces. We believe that penetration of the polymer surface by the dimethylpolysiloxane occurs by capillary action whereby the molecules of the preservative composition, and especially the dimethylpolysiloxane fluid, are drawn into the surface. There, the molecules can hook or wrap around the molecules of the material to be protected to physically attach themselves thereto. The process is enhanced by the incorporation of a wetting agent and an agent which in upon application of the composition to the polymer surface being treated causes the emulsion to break and the water to "rain out" of the emulsion leaving a uniform film.

DETAILED DESCRIPTION OF THE INVENTION

It has been found that some measurable protection against environmental stresses can be imparted to rubber and other polymer surfaces using an emulsion of an dimethylpolysiloxane fluid in water. An object of the invention is to provide a substantial degree of penetrating protection and preservation over a substantial period of time. The improvement of the compositions of this invention over those of the Palcher invention is not realized unless all of the classes of compounds (a-e) are present. The performance is optimized when the constituents are in certain proportions.

The classes of compounds are as follows;

(A) DIMETHYLOPOLYSILOXANES

The dimethylpolysiloxane fluid or liquid silicone in the composition functions as lubricant for the polymer molecules and as waterproofing the rubber. Both mechanisms impede scission. Scission is promoted by the presence of ozone and other environmental chemicals. A thin film of silicone applied to the polymer being treated both at the surface and within the matrix is most effective in helping to exclude deleterious materials.

The compositions of the invention have at least one viscosity dimethylorganopolysiloxane fluid. These fluids are also referred to as silicone fluids and are distinguished from silicone elastomers and resins. They are basically dimethylpolysiloxnane fluids, which are substantially linear in nature. The structure of the dimethylpolysiloxane fluid is shown by the following formula where n is the number of units:

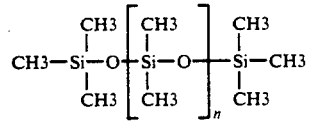

These dimethylpolysiloxane fluids are available as mixtures of polymers of varying chain length. It has been found for purposes of the invention that the viscosity of the silicone fluids is a measure of the effectiveness. Silicone fluids can be used which have a viscosity range from 10 centistokes up to about 100,000 centistokes. Preferably, the viscosity of the silicone fluids to be used should be in the range of from about 100 centistokes up to about 10,000 centistokes. Most preferably, the viscosity is in the range of about 300–400 centistokes.

In a preferred embodiment a mixture of two fluids, one having a low viscosity fluid (50-100 centistokes), and the other a higher viscosity fluid (1,000 to 10,000 centistokes) results in the best performance attributes. We believe that the increased performance obtained by using two different viscosity fluids is based upon penetration. The high viscosity dimethylpolysiloxane has some difficulty penetrating the surface to be protected. It remains on or close to the surface of the polymer being treated and provides a protective surface barrier. It also provides added gloss. The low viscosity dimethylpolysiloxane on the other hand, if prepared in a composition of this invention, rapidly penetrates the surface. This low viscosity fluid acts as a polymeric lubricant in the polymer matrix. It also coats the polymer molecules and provides protection within the matrix. A key to making this composition work is that the emulsion must be adequately wet out on the polymer surface and an effective emulsion breaking agent "rain out agent" must be present to allow the emulsion to break rapidly, and the water to run off. Therefore it must be realized that the various components of this invention (a-e) are critical to the enhanced protection and the deposition of a uniform surface on the polymer being protected. Compounds of the Palcher invention without the other additives cannot attain this subsurface penetration, and in fact are only active at the polymer surface. Palcher states in part "When the viscosity becomes too low, the average chain length of the polymer is too small to provide adequate protection" (U.S. Pat. No. 3,956,174 Col. 4 line 44.)

Low viscosity dimethylpolysiloxane polymers are known to be effective lubricants. As shown in the table, these Siltech F 50 (a 50 centistoke dimethylpolysiloxane), and Siltech AF LV (a 50 centistoke amino functional dimethylpolysiloxane) dramatically reduce the fiber to metal friction on polyester fiber when compared to known lubricants.

FRICTIONAL PROPERTIES

| PRODUCT | DESCRIPTION (70 F.) | LUBRICATION DATA[1] Coefficient of Friction FIBER/METAL 100 (m/min.) | 300 (m/min.) |
|---|---|---|---|
| Butyl Stearate | White Liquid | 0.17 | 0.21 |
| Tridecyl Stearate | Clear Liquid | 0.25 | 0.27 |
| Siltech F 50 | Clear Liquid | 0.06 | 0.01 |
| Siltech AF-LV | Clear Liquid | 0.07 | 0.02 |

[1]Rothchild F Meter. Fiber: 150 denier polyester. Temperature: 72 F., Relative humidity: 60%

It is therefore not surprising that these materials also lubricate other polymers as well.

(B) AMINOFUNCTIONAL DIMETHYLPOLYSILOXANE

Inclusion of from 5-10% by weight, based on the weight of amino substituted dimethylpolysiloxane fluid provides increased adherence to the surface to be protected. In a preferred embodiment, amino compounds having a high molecular weight and one having a low molecular weight are added to the composition. Compounds of this type are available commercially from Siltech Inc. Norcross Ga and are sold under the trade name Siltech AF (1,000 centistokes) and Siltech AF-LV (50 centistokes). As with the selection of a high and low viscosity dimethylpolysiloxane component, the selection of two differing viscosity amino dimethylpolysiloxane fluids, will allow for the penetration of the lower molecular weight species to provide intermolecular lubrication of the polymer molecule being treated, and a higher gloss more substantive surface treatment provided by the higher molecular weight amino functional polymer.

A typical amino functional dimethylpolysiloxane polymer conforms to the following structure;

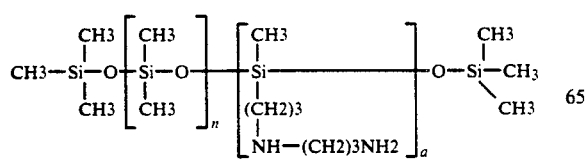

(C) WETTING AGENT

The wetting agent is a critical additive in the compositions of this invention. They improve the penetration of the various dimethylpolysiloxane molecules onto and into the polymer being treated. Without a proper wetting agent a nonuniform coat is applied, which needs to be physically worked into the polymer surface. The inclusion of the wetting agent allows for rapid penetration onto and into the polymer being protected, as well as eliminating the need to wipe the surface.

Wetting agents are different than the emulsification agent used to produce stable emulsions. The emulsification agent is chosen so that the oil soluble dimethylpolysiloxane materials can be kept in micelles in the emulsion. The wetting agents have a different HLB values and have no effect upon the micelle. They are added to wet the surface of the polymer. The HLB, is the so called Hydrophylic-Lipophyilic Balance, is the ratio of oil soluble and water soluble portions of a molecule, and is a concept well known to those skilled in the surface active chemistry art. It is also well accepted that wetting is a property that is most directly affected by the surfactants at the interface, while emulsification properties are micellar properties.

The wetting agent allows for a more uniform film of the oil soluble component of the preservation composition to deposit on the hydrophobic polymer surface being treated.

The wetting agent reduces the surface tension of the aqueous emulsion. An aqueous surface tension of 30 dynes/cm2 at 1.0 % active surface active agent is desired. Surface active agents which reduce the surface tension to or below this value are useful in preparation of the compositions of this invention.

Results of evaluations of compositions of this invention indicate that surface tension is the major predictor of performance. Typical surface tension values for wetting agents and their performance in the compositions of this invention are listed below;

| | Surfactants | | |
|---|---|---|---|
| Example | Surface Active Agent | 1% Surface Tension | Performance |
| 1 | Nonylphenol 5 EO | 28.3 | 7 |
| 2 | Nonylphenol 6 EO | 28.8 | 7 |
| 3 | Nonylphenol 8 EO | 29.6 | 6 |
| 4 | Nonylphenol 9 EO | 31.2 | 4 |
| 5 | Nonylphenol 15 EO | 34.5 | 3 |
| 6 | Sodium Oleate | 25.0 | 7 |
| 7 | Sodium Lauryl sulfate | 25.2 | 7 |
| 8 | Pulronic F 68 | 45.6 | 3 |
| 9 | Tridecyl 12 EO | 29.6 | 6 |
| 10 | Tridecyl 6 EO | 25.0 | 8 |
| 11 | Decyl 3 EO | 24.7 | 9 |
| 12 | Decyl 9 EO | 27.2 | 8 |
| 13 | Decyl 20 EO | 36.7 | 4 |
| 14 | Lauryl 4 EO | 26.9 | 8 |
| 15 | Lauryl 11 EO | 30.9 | 6 |
| 16 | Lauryl 23 EO | 35.0 | 3 |
| 17 | Stearyl 6 EO | 39.9 | 2 |
| 18 | Stearyl 16 EO | 40.2 | 2 |
| 19 | Lauric Acid 9 EO | 29.8 | 7 |
| 20 | Di-2-ethylhexyl Sulfosuccinate | 28.0 | 8 |
| 22 | Silwet 7600 | 25.1 | 8 |
| 23 | Silwet 7607 | 23.4 | 8 |
| 24 | Silwet L-77 | 20.5 | 8 |
| 25 | Silwet L 7001 | 30.5 | 4 |
| 26 | Silwet L 7605 | 30.2 | 4 |
| 27 | Di isobutyl sulfosuccinate | 46.0 | 4 |

-continued

| | Surfactants | | |
|---|---|---|---|
| 28 | Dioctylsulfosuccinate | 25.0 | 9 |
| 29 | Ditridecyl sulfosuccinate | 29.0 | 8 |

*Formula tested was:

| | |
|---|---|
| (a) dimethylpolysiloxane | |
| 1,000 Centistoke (Siltech F 1,000) | 20.0 |
| 100 Centistoke (Siltech F 100) | 9.5 |
| (b) aminofunctional dimethylpolysiloxane | |
| 1,000 Centistoke (Siltech AF) | 1.0 |
| 100 Centistoke (Siltech AF-LV) | 1.0 |
| (c) wetting agent various | 1.0 |
| (d) emulsification agent | |
| Tergitol 15-S-3 | 2.5 |
| Tergitol 15-S-5 | 2.5 |
| (e) rain out agent | |
| N,N-bis(tallow amido-ethyl)-N,N dimethyl ethylammonium chloride | 2.5 |
| (f) water | 60.0 |

(F) WATER

Rating system; Rubber surface was sprayed with a 10% active emulsion and allowed to dry untouched for 3 hours. The surface was then rated for (a) uniformity of application (streaking), (b) gloss of application, (c) penetration of application (d) durability of application and (d) water break from the emulsion. Two points per category was given, for a maximum of ten.

Rating scale ; 0 (lowest)-10 (Best)

(D) EMULSIFICATION AGENT

The emulsification agent facilitates the production of a stable emulsion. In short it allows for the oil soluble dimethylpolysiloxanes and other oils to remain suspended in a milky white emulsion, until they can be applied to the surface of the polymer being protected.

Many types of emulsifiers can be used in the preparation of the compounds of this invention. The preferred materials are nonionic compounds which have an HLB of between 8 and 10.

HLB is the measure of the amount of water soluble component on an emulsification agent. Typically for nonionics it is calculated as HLB=(% water soluble component in the surface active agent)/5

Therefore emulsification agents useful in the practice of this invention will have between 40 and 50 % water soluble component present in the compound. Most commonly, a pair of emulsifiers are blended to get an HLB with a numerical average of 8 to 10. Emulsifier pairs generally result in a more stable emulsion.

Examples of emulsifiers which are useful are;

| Example | Material(s) | HLB | Performance |
|---|---|---|---|
| 30 | Neodol 23-3 C12-C13 Oxo alcohol 3 mole ethoxylate | 8 | 7 |
| 31 | Decyl alcohol 3 Decyl alcohol 3 mole ethoxylate | 9 | 8 |
| 32 | Decyl alcohol-6 | 12.5 | split |
| 33 | Nonyl phenol 5 | 10.0 | 7 |
| 34 | 50/50 blend of Tergitol 15 S-3 and Tergitol 15-S-5 | 9.5 | 9 |

*Formula tested for this section was:

(a) dimethylopolysiloxane

| | |
|---|---|
| 1,000 Centistoke (Siltech F 1,000) | 20.0 |
| 100 Centistoke (Siltech F 100) | 9.5 |
| (b) aminofunctional dimethylpolysiloxane | |
| 1,000 Centistoke (Siltech AF) | 1.0 |
| 100 Centistoke (Siltech AF-LV) | 1.0 |
| (c) wetting agent Decyl alcohol 4 EO | 1.0 |
| (d) emulsification agent Various | 5.0 |
| (e) rain out agent Example 37 | 2.5 |
| (f) water | 60.0 |

Rating system; Rubber surface was sprayed with a 10 % active emulsion and allowed to dry untouched for 3 hours. The surface was then rated for (a) uniformity of application (streaking), (b) gloss of application, (c) penetration of application (d) durability of application and (d) water break from the emulsion. Two points per category was given, for a maximum of ten.

(E) RAIN OUT AGENT

The "rain out agent" is a cationic nitrogen containing compound which is added to the treatment composition, so that upon application of the composition to the polymer surface being treated, causes the emulsion to break and the water to "rain out" of the emulsion leaving a uniform film. The agent does not effect the emulsion stability while in concentrated form. It interacts with the polymer being treated and causes the micelle containing the silicone components to break and deposit in a uniform film. The polymer surface has been "wet out" by the incorporation of the proper wetting agent.

Rain out agents conform to the following structure;

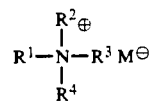

wherein:
$R^1$ $R^2$ $R^3$ and $R^4$ may be the same or different and are selected from alkyl, alkyl amido, aryl or heterocyclic with the proviso that a minimum of 18 carbon atoms are present in the molecule;

M is an anion needed for charge balance and is selected from halogen, or sulfate.

Compounds include;

| Example | $R^1$ | $R^2$ | $R^3$ | $R^4$ | M | Performance |
|---|---|---|---|---|---|---|
| 35 | C18H37 | C18H37 | CH3 | CH3 | Cl | 7 |
| 36 | C18H37 | CH3 | CH3 | CH3 | Cl | 6 |
| 37 | C12H25 | CH3 | CH3 | CH3 | Cl | 5 |
| 38 | C18H37 | CH2CH2OH | CH2CH2OH | CH3 | SO3 | 7 |

In a preferred species $R^1$ $R^2$ $R^3$ and $R^4$ may independently be alkyl amido

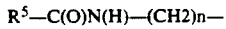

| $R^1$ | $R^2$ | $R^3$ | $R^4$ | $R^5$ | M |
|---|---|---|---|---|---|
| Example 39 | | | | | Performance; 8 |
| Alkyl amido | CH2CH2OH | CH2CH2OH | CH3 | C17H35 | Cl |

-continued

| $R^1$ | $R^2$ | $R^3$ | $R^4$ | $R^5$ | M |
|---|---|---|---|---|---|
| Example 40 | | | | Performance: 9 | |
| Alkyl amido | Alkyl amido | CH3 | CH3 | C17H35 | Cl |
| Example 41 | | | | Performance: 8 | |
| Alkyl amido | CH3 | CH3 | CH3 | C14H29 | Cl |
| Example 42 | | | | Performance: 8 | |
| Alkyl amido | Alkyl amido | CH2CH2OH | CH2CH3 | C12H25 | SO3 |

| Formula tested for this section was: | |
|---|---|
| (a) dimethylpolysiloxane | |
| 1,000 Centistoke (Siltech F 1,000) | 20.0 |
| 100 Centistoke (Siltech F 100) | 9.5 |
| (b) aminofunctional dimethylpolysiloxane | |
| 1,000 Centistoke (Siltech AF) | 1.0 |
| 100 Centistoke (Siltech AF-LV) | 1.0 |
| (c) wetting agent | |
| Decyl alcohol 4 EO | 1.0 |
| (d) emulsification agent | |
| Tergitol 15-S-3 | 2.5 |
| Tergitol 15-S-5 | 2.5 |
| (e) rain out agent | |
| various | 2.5 |
| (f) water | 60.0 |

Rating system; Rubber surface was sprayed with a 10% active emulsion and allowed to dry untouched for 3 hours. The surface was then rated for (a) uniformity of application (streaking), (b) gloss of application, (c) penetration of application (d) durability of application and (d) water break from the emulsion. Two points per category was given, for a maximum of ten.

What is claimed:

1. An emulsion composition which comprises an admixture of the following components;
   (a) a dimethylpolysiloxane;
   (b) an amino functional dimethylpolysiloxane;
   (c) a wetting agent, having a surface tension in water of 1% of below 30 dynes/cm$^2$;
   (d) an emulsification compound having an HLB between 8 and 11;
   (e) a cationic rain out agent which conforms to the following structure;

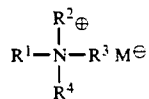

wherein;
   $R^1$ $R^2$ $R^3$ and $R^4$ may be the same or different and are selected from alkyl, alkyl amido, aryl or heterocyclic with the proviso that a minimum of 18 carbon atoms are present in the molecule;
   M is an anion needed for charge balance and is selected from halogen, or sulfate; and
   (f) water.

2. A composition of claim 1 wherein the wetting agent is a nonionic alkoxylated fatty alcohol.

3. A composition of claim 1 wherein the wetting agent is an anionic sulfosuccinate.

4. A composition of claim 1 wherein the rain out agent is an amido quaternary compound.

5. An process for treating polymeric surfaces which comprises the application of an effective treating amount of an emulsion composition which comprises; from 10 to 90% water and the remaining non water components made up of;
   (a) 65-97% of a dimethylpolysiloxane
   (b) 1-20% of an aminofunctional dimethylpolysiloxane
   (c) 0.5-5% of a wetting agent having a surface tension in water of 1% of below 30 dynes/cm$^2$;
   (d) 1-10% of an emulsification agent having an HLB between 8 and 11;
   (e) 0.5-20% of a cationic rain out agent conforming to the following structure;

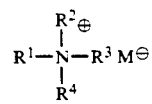

wherein;
   $R^1$ $R^2$ $R^3$ and $R^4$ may be the same or different and are selected from alkyl, alkyl amido, aryl or heterocyclic with the proviso that a minimum of 18 carbon atoms are present in the molecule;
   M is an anion needed for charge balance and is selected from halogen, or sulfate.

6. A process of claim 5 wherein the wetting agent is a nonionic alkoxylated fatty alcohol.

7. A process of claim 5 wherein the wetting agent is an anionic sulfosuccinate.

8. A process of claim 5 wherein the rain out agent is an amido quaternary compound.

* * * * *